United States Patent [19]

Maples

[11] 4,110,219
[45] Aug. 29, 1978

[54] REVERSE OSMOSIS WATER UNIT

[76] Inventor: Paul Douglas Maples, 772 S. Sierra Ave., Solana Beach, Calif. 92075

[21] Appl. No.: 764,828

[22] Filed: Feb. 2, 1977

[51] Int. Cl.$^2$ .......................... B01D 31/00; C02B 1/82
[52] U.S. Cl. .................................. 210/245; 210/321 R; 210/433 M; 210/470; 210/494 M
[58] Field of Search ............... 210/321 R, 245, 433 M, 210/470, 494 M, 502, 489, 490, 491

[56] References Cited

U.S. PATENT DOCUMENTS

| | | | |
|---|---|---|---|
| 3,386,583 | 6/1968 | Merten | 210/321 R |
| 3,397,790 | 8/1968 | Newby et al. | 210/494 M |
| 3,504,796 | 4/1970 | Bray | 210/321 R |
| 3,670,892 | 6/1972 | Baerg et al. | 210/321 R |
| 3,682,318 | 8/1972 | Rigopulos | 210/433 M |
| 3,813,334 | 5/1974 | Bray | 210/321 R |
| 3,888,250 | 6/1975 | Hill | 210/494 M |
| 3,939,074 | 2/1976 | Bray | 210/433 M |
| 3,966,616 | 6/1976 | Bray | 210/433 M |
| 4,013,564 | 3/1977 | Nose | 210/321 R |
| 4,032,457 | 6/1977 | Matchett | 210/489 |

*Primary Examiner*—Charles N. Hart
*Assistant Examiner*—David R. Sadowski
*Attorney, Agent, or Firm*—Brown & Martin

[57] ABSTRACT

A portable water container for holding water treated by reverse osmosis water purification, which container rests on a base. The base has a recess in which a reverse osmosis unit is laid, with water connecting means for supplying water to the portable water container and for providing an overflow. The reverse osmosis unit can be quickly and easily removed from the base by merely lifting the osmosis unit from the recess and pulling stopper type end connectors from the ends thereof. The walls of the recessed portion of the base restrains movement of the stopper end connectors from the osmosis units during use. Also a unique reverse osmosis unit is used that has activated carbon impregnated paper therein through which the water passes providing further water treatment.

8 Claims, 9 Drawing Figures

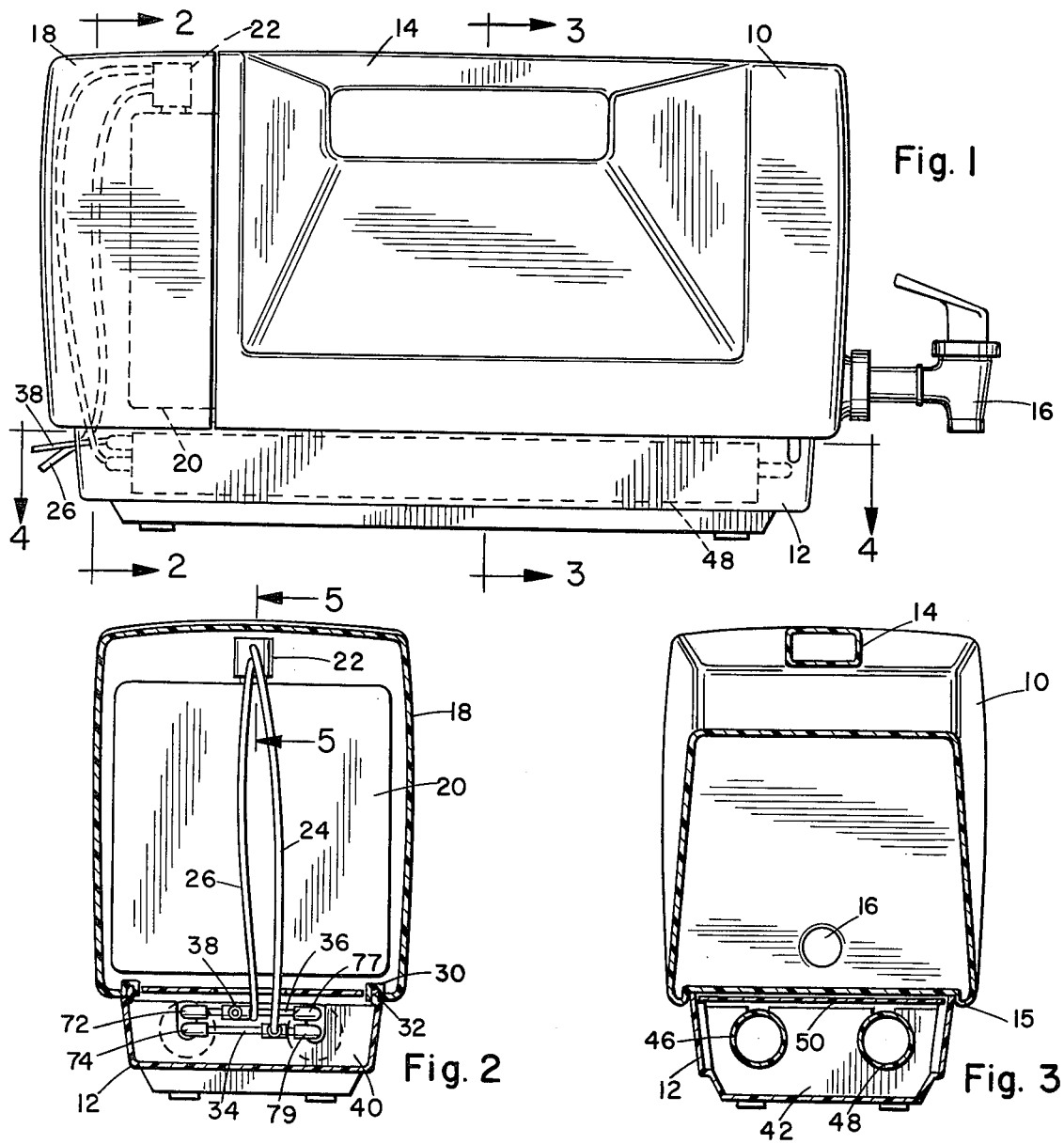
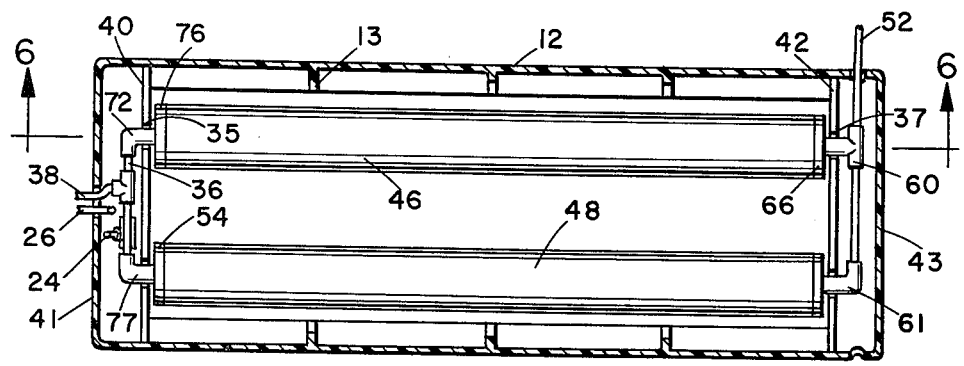

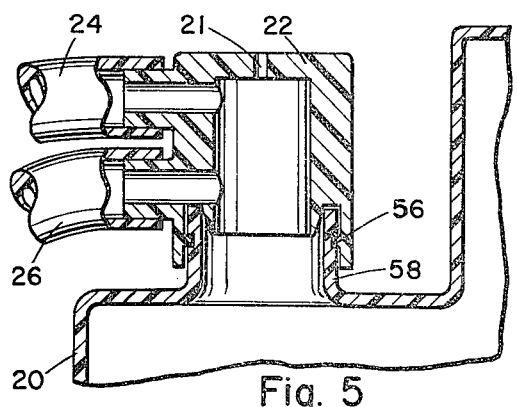
Fig. 5
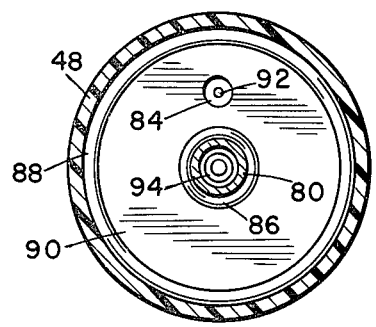
Fig. 7
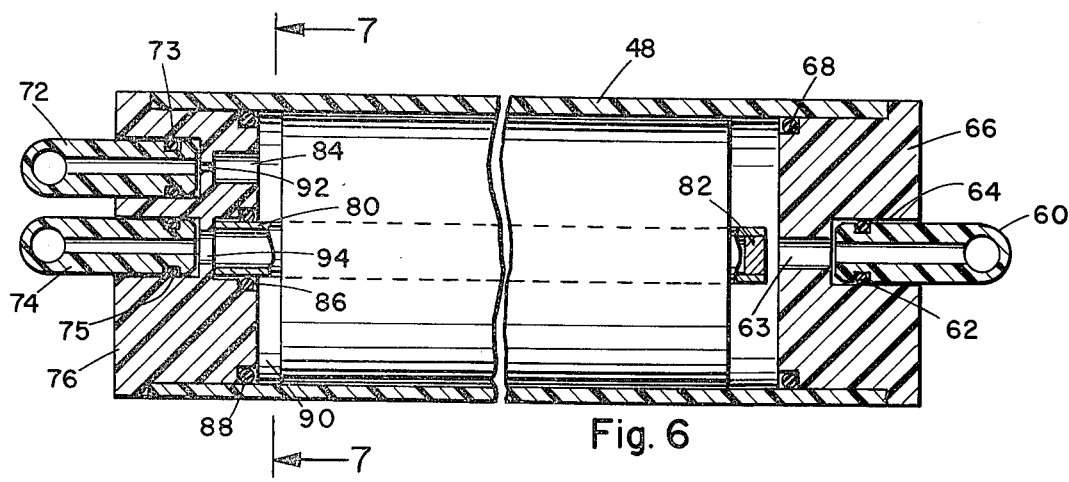
Fig. 6
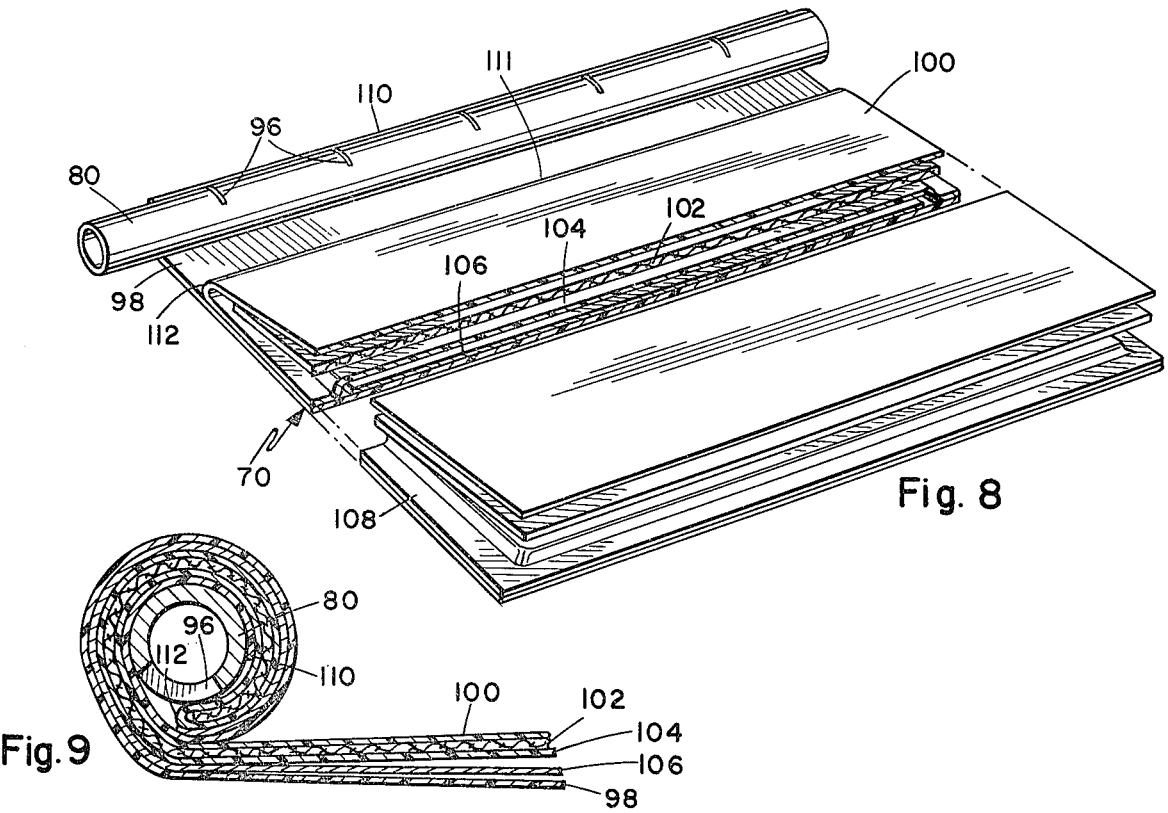
Fig. 8
Fig. 9

REVERSE OSMOSIS WATER UNIT

BACKGROUND OF THE INVENTION

There are many different types of reverse osmosis water treatment or purifying units that are presently being used. The majority of these units comprise complex structures that pass water through a reverse osmosis unit into a reservoir and then use motors, pumps or the like to pump the water from the reservoir to point of use. These units thus require pump systems or other elaborate systems for moving the treated water. Furthere these units normally comprises permanent installations that are installed into cabinets or the like adjacent sources of water, such as sinks in homes. The reverse osmosis units that are used are expensive and difficult to change in the systems. This tends to cause use of the reverse osmosis modules far beyond the point that they are still effective in treating the water.

It is thus advantageous to have a simplified reverse osmosis water treatment or purifying system, that is lightweight, has a simplified and inexpensive construction, that is a self-contained unit that does not require installation into cabinets or the like, and that provides treated water with a quick installation onto a faucet or the like and that provides water to a portable container from which the water may be easily dispensed by gravity, in the manner of water bottles.

SUMMARY OF THE INVENTION

In an illustrative embodiment of the invention, a portable water container is positioned on a base. The container has a handle for carrying and has a size comparable to a water bottle. One end of the container has a spigot for discharging the water. The other end of the container, at the top end thereof, has an input opening for inserting water into the container. The input opening has a connector with an overflow line for allowing water to overflow into the same discharge drain in which the brine is being discharged.

The base means has a recess with end walls for receiving reverse osmosis water treating means that may comprise one, two or multiple reverse osmosis modules. These reverse osmosis modules are normally cylindrical in shape and are contained within individual water impervious tubes. The ends of the tubes are sealed and have bores in which removable stopper type end connector means are positioned that use O-rings or the like to provide sealed, slidable connections. These removable stopper end connections may be quickly inserted or removed from position, by merely pulling or pushing on the connectors. Thus, the stoppers can be quickly and easily removed allowing quick interchangeability of the reverse osmosis modules. When the stopper type end connector means are connected to the reverse osmosis modules and the modules are laid in the recessed portion of the base means, then the end walls are spaced close to the stopper type end connecors preventing them from being moved outwardly by internal water pressure to a point that would cause leakage.

Water conduit means brings water into the reverse osmosis unit at one end and carries discharge brine from the other end of the reverse osmosis unit to a drain, and also at the other end conducts treated water through an input connector to the portable water container. The end connectors connect the input water conduit and the brine discharge conduit with fluid channels through to the reverse osmosis units. These channels have a given diameter to provide full water flow. However, the channel to the brine discharge has a reduced diameter, providing back pressure to brine water flow, as required in operation of a reverse osmosis module.

While the reverse osmosis water unit of this invention will operate with about any known reverse osmosis module, the reverse osmosis water unit disclosed herein has a particularly adaptable reverse osmosis module. This module has an internal rigid tube with apertures through the wall, around which is wrapped a sheet of material. A folded over reverse osmosis membrane has sandwiched therebetween a brine spacer or influent conduit. The lower sheet of the membrane material is secured by adhesives or the like around three sides to corresponding sides of the sheet material and has sandwiched therebetween a layer of activated carbon impregnated paper. Thus, when in the wrapped condition, the water to be treated passes through the brine spacer material and flows radially through the membrane material and through the activated carbon impregnated material through the opening between the membrane material and the sheet material and into the opening of the inner tube providing purified or treated water that additionally is passed through carbon material that removes impurities, odors and the like.

It is therefore an object of the invention to provide a new and improved reverse osmosis water unit.

It is another object of this invention to provide a new and improved reverse osmosis water unit module for treating or purifying water.

It is another object of this invention to provide a new and improved reverse osmosis water unit that provides an inexpensive, simple in construction unit that does not require installation into cabinets or the like and does not require motors, pumps or the like for discharge of the purified or treated water.

Other objects and many advantages of this invention will become more apparent upon a reading of the following detailed description and an examination of the drawings, wherein like reference numerals designate like parts throughout and in which:

FIG. 1 is a side elevational view of an embodiment of the water purification unit of this invention;

FIG. 2 is a sectional view taken on lines 2—2 of FIG. 1;

FIG. 3 is a sectional view taken on lines 3—3 of FIG. 1;

FIG. 4 is a top plan view of the uncovered base member;

FIG. 5 is a sectional view with parts broken away of the filling cap for filling the portable container, that is taken on lines 5—5 of FIG. 2;

FIG. 6 is a sectional view taken on lines 6—6 of FIG. 4;

FIG. 7 is a sectional view taken on lines 7—7 of FIG. 6;

FIG. 8 is a perspective view of an embodiment of the reverse osmosis module that is in partially dissembled form;

FIG. 9 is a sectional view of the embodiment illustrated in FIG. 8.

Referring now to FIGS. 1 through 4, a portable water container 10 rests on a base means 12. The portable water container 10 has a handle 14 for carrying the container 10. The container 10 would normally have a size similar to that of a bottle containing fresh water. A spigot 16 at one end permits removal of the water. A necked, opening 58 on the other upper end of the container 10 permits insertion of water into the container 10. While the opening 58 may be capped by a cap other than the water filling cap 22, see FIG. 5, this opening 58 can also be left open to allow air into the container 10, when water is flowing out spigot 16. Cap 22 has a small hole 21 for air flow.

The base 12 has an inner recessed volume with internal strengthening ribs 13 and internal, spaced walls 40 and 42. Positioned in the recessed space are reverse osmosis modules 46 and 48. These can be known reverse osmosis water modules, or can be that reverse osmosis module described in FIGS. 8 and 9 herein.

The reverse osmosis modules 46 and 48 have water impervious outer cylindrical members. These cylindrical members are closed at each end by ends 66 and 76 that are fixed in position by adhesives, cement or the like. O-rings 68 and 88 also aid in providing a water seal. Connected at each end, see FIG. 6, are removable stopper end connector means 60, 72 and 74. These end connectors are cylindrical plug or stopper like members that slidably fit inside the inner surface of the cylindrical cover. O-rings 62, 73 and 75 provide a seal against water passage around the stopper plug members 60, 72 and 74. Yet the stopper plug members can be easily removed by merely pulling on the stopper members, pulling them out from the slidably inserted position. By so doing, the module 48 is removed from the base and a new reverse osmosis module is quickly inserted in its place. This allows quick and easy changing of the reverse osmosis modules.

Water conduit means, namely conduits 24, 26, 36, 34, 38 and 52, carry water to the reverse osmosis modules for treatment, and carry the brine water to a discharge, and carry the treated or purified water to the container 10. Fitting 60 is connected to line 52 and fits into the end of end connector 66, to supply water through channel 63, see FIG. 6, to the reverse osmosis module 70. Water flows through reverse osmosis module 70, with the treated water passing out through tube 80, which is the center tube of the reverse osmosis module 70, and then through channel 94 of end 76, through end connector 74 and tube 24. This is the treated or purified water discharge.

The treated water, when passing through connecting line 24 to filling cap 22, passes through neck opening 58 into the internal volume of the container 10. It will be noted that filling cap 22 has a radial shoulder 56 that fits into a corresponding recess in neck 58 to hold the filling cap 22 in position. As an overflow protection, when water fills container 10 and then rises into cap 22, it will then flow through line 26 to be discharged into the drain.

The brine water from the reverse osmosis module 70 flows through channel 84 of end 76, and through the reduced diameter channel 92 to end connector 72. End connector 72 connects with brine discharge line 38, which brine water discharges into the drain. It will be noted that the reduced diameter of channel 92, relative to channels 63 and 94, provides the back pressure required on the brine water discharge for operation of the reverse osmosis module 70.

While the foregoing connections and water flow have been described relative to one reverse osmosis module, namely reverse osmosis module 48, it may be understood that the same connectors apply to reverse osmosis module 46, as the units are connected in parallel. The water pressure on the end connector means, i.e. 60, 61, 72, 74, 77 and 79, normally is not sufficient to force the connectors to move outwardly from the inner sealed positions illustrated in FIG. 6. However, in some systems, the water pressure can become excessive wherein the water pressure over the surface areas of the respective end connector means can be sufficient to force the connectors out. However, when laid in the recess of the base means 12, the end connectors are adjacent to walls 41 and 43. Thus, any movement of these end connectors outwardly will cause them to immediately abut walls 41 and 43 and thus be held in the sealed position and condition. A positive holding of the reverse osmosis modules and connectors in a water sealed condition is thereby accomplished, and yet the modules may be quickly and easily removed and disassembled.

The space between, for example, end wall 43 and the inner wall 42 of the base member 12, provides a space for the fitting of the water conduit means. This space is also present at the other end of the base member 12 between walls 40 and 41. Walls 40 and 42 have recesses 35 and 37 for supporting the modules. When the reverse osmosis modules 46 and 48 are in position, a plate member 50 is placed over the recess and rests on the upper edge surfaces of the internal ribs 13. The container 10 rests on the base member by having a grooved lower surface 20 that fits over raised end projection 32. This also coacts with the lower downwardly projecting bottom 15, as illustrated in FIG. 3, and provides a stable positive support for container 10 on the base member 12.

FIG. 8 illustrates a reverse osmosis module 70 that has an inner tube member 80 with holes 96 along the length thereof, and with each end being open. One of the ends is plugged in the manner illustrated by plug 82 in the embodiment illustrated in FIG. 6. A flexible sheet 98 of flexible material, such as non-woven Dacron which is a loosely woven, porous, paper type material, is connected at one end edge to tube 80, at a point adjacent one side edge of the holes 96. This connection at 110 may be made by adhesives or the like. Positioned on the surface of the flexible sheet 98 is a folded sheet of a known reverse osmosis membrane 100. Positioned within the folded reverse osmosis membrane sheet 100 is a knwn layer of osmosis brine spacer 102. This may comprise a product known as "DuPont VEXAR". Also positioned between the lower sheet 104 of membrane 100 and the upper surface of the sheet 98, is a layer 106 of activated carbon impregnated filter paper. The edges 108 of the lower sheet of membrane material 104 are secured by adhesive or the like to the sheet 98, thus leaving the end 111 open to the tube 80. The outer edges of the membrane 104 and flexible sheet 98 are sealed against passing water.

The sheet material 98 and the reverse osmosis filter sheets positioned thereon are then wrapped around the tube 80 as illustrated in FIG. 9. One end of tube 80 is plugged and water is then pressed upon the end of the wrapped material as illustrated in FIG. 6. The water to be treated flows through the spacer 102, and through the reverse osmosis membrane material and activated carbon impregnated filter paper to the internal tube 80, where the treated or purified water flows through aperture 96 and into the internal volume of tube 80, and then through channel 94, end connector 74 and conduit 24 to the container 10. The brine water flows longitudinally through brine spacer 102 and out the end through channel 84, end connector 72 and through line 38 to the discharge drain.

Thus, activated charcoal is incorporated in the reverse osmosis module removing odors, impurities and the like from the water. It may be recognized that the entire module, after being wrapped as illustrated in FIG. 9, is then inserted into an impervious container, such as container 48 as illustrated in FIG. 6.

Having described my invention, I now claim:

1. A reverse osmosis water unit comprising:

a portable water container for receiving and dispensing treated water, base means for supporting said water container, said base means having a recessed volume with end walls, reverse osmosis water treating means for being laid lengthwise in said recess between said spaced walls, water conduit means for conducting water to said reverse osmosis means and for conducting treated water from said reverse osmosis means to said water container, removable stopper type end connector means for connecting the ends of said reverse osmosis means to said water conduit means by a slip connection, sealing means for sealing the connection of said end connector means to said reverse osmosis means against water leakage, and the composite length of said reverse osmosis means and the connected end connector means being slightly less than the distance between said end walls of said base means, whereby said walls prevent outward sliding movement of said end connectors when said reverse osmosis means are positioned in the recess volume of said base means.

2. A reverse osmosis water unit as claimed in claim 1 wherein:

said reverse osmosis water treating means having ends with bores therein, and said removable stopper type end connectors comprising cylindrical plug members for being slidably inserted in the bores.

3. A reverse osmosis water unit as claimed in claim 2 including:

O-ring means positioned between said cylindrical plugs and the inner surface of said bores providing said sealing means, internal channels through the ends of said reverse osmosis means that communicate with said bores and having a first internal diameter for conducting treated water passing from said reverse osmosis means to said water container, and the internal channel for conducting discharge brine water through the end of the reverse osmosis means to said conduit means having a substantially smaller internal diameter than said first internal diameter providing fluid back pressure on said reverse osmosis water treating means.

4. A reverse osmosis water treating unit as claimed in claim 3 wherein:

said reverse osmosis water treating means comprising at least a pair of reverse osmosis water module means connected in parallel.

5. A reverse osmosis water unit as claimed in claim 1 wherein:

said base means having inner spaced walls that are spaced from said end walls and which inner walls are shaped to receive and support the reverse osmosis means.

6. A reverse osmosis water unit as claimed in claim 5 wherein:

one end of said container having an upper opening with an extended neck portion, cap means for fitting over said neck portion, said cap portion having first and second nozzle ends for being connected to said conduit means, and the lower one of said nozzle means being connected to the treated water discharge and the upper one of said nozzle means being connected to the conduit line leading to an overflow discharge.

7. A reverse osmosis water unit as claimed in claim 6, wherein:

said base means having a vertical upwardly projecting enclosure member with three closed sides and a closed top with one open side for sliding over and enclosing said cap means and one end of said container.

8. A reverse osmosis water unit as claimed in claim 7 wherein:

said portable water container at the opposite end of said cap means and at the lower side thereof having a water discharge spiggot means.

* * * * *